(12) United States Patent
Levine et al.

(10) Patent No.: US 10,399,269 B2
(45) Date of Patent: Sep. 3, 2019

(54) THREE DIMENSIONAL (3D) PRINTING OF EPOXY, HARDENER, AND PARTS OF AN OBJECT TO BE ASSEMBLED LATER

(71) Applicant: XEROX CORPORATION, Norwalk, CT (US)

(72) Inventors: Jonathan D. Levine, Rochester, NY (US); Donald M. Pangrazio, III, LeRoy, NY (US)

(73) Assignee: XEROX CORPORATION, Norwalk, CT (US)

(*) Notice: Subject to any disclaimer, the term of this patent is extended or adjusted under 35 U.S.C. 154(b) by 323 days.

(21) Appl. No.: 15/279,875

(22) Filed: Sep. 29, 2016

(65) Prior Publication Data

US 2018/0022019 A1 Jan. 25, 2018

Related U.S. Application Data

(62) Division of application No. 14/136,563, filed on Dec. 20, 2013, now Pat. No. 9,527,241.

(51) Int. Cl.
*B29C 35/08* (2006.01)
*B29C 67/00* (2017.01)
*B29C 64/112* (2017.01)
*B33Y 10/00* (2015.01)
*B29C 64/106* (2017.01)

(52) U.S. Cl.
CPC .......... *B29C 64/112* (2017.08); *B29C 64/106* (2017.08); *B33Y 10/00* (2014.12)

(58) Field of Classification Search
CPC ............ B29K 2025/08; B29K 2033/08; B29K 2033/12; B29K 2033/20; B29K 2105/0085; B29K 2105/251; G03G 13/22; G03G 15/224; B29C 64/10; B29C 64/124; B29C 64/135; B29C 64/205; B29C 64/268; B33Y 10/00; B33Y 70/00
USPC ..................................... 425/174.4, 375, 385
See application file for complete search history.

(56) References Cited

U.S. PATENT DOCUMENTS 7,589,868 B2   9/2009 Velde et al.
2002/0093115 A1  7/2002 Jang et al.

FOREIGN PATENT DOCUMENTS

EP  6860677 B1  8/2000
EP  1223866 B1  5/2001

*Primary Examiner* — Joseph S Del Sole
*Assistant Examiner* — Thu Khanh T Nugyen
(74) *Attorney, Agent, or Firm* — MH2 Technology Law Group LLP

(57) ABSTRACT

A three dimensional (3D) printer and method for dispensing a material to form a 3D substructure and for dispensing an adhesive onto the 3D substructure. The adhesive printed onto the 3D substructure may be used to attach the 3D substructure to another substructure such as a conventionally formed substructure or another 3D printed substructure. Printing the adhesive using the 3D printer during the same 3D manufacturing process used to print the 3D substructure may improve precision of the location at which the adhesive is dispensed, thereby improving the quality of superstructure created by joining the substructures. An embodiment of the present teachings may decrease the overall time and cost to attach substructures.

11 Claims, 5 Drawing Sheets

THREE DIMENSIONAL (3D) PRINTING OF EPOXY, HARDENER, AND PARTS OF AN OBJECT TO BE ASSEMBLED LATER

PRIORITY CLAIM

This application is a divisional application of, and claims priority to, U.S. patent application Ser. No. 14/136,563, filed on Dec. 20, 2013 (now U.S. Pat. No. 9,527,241) the disclosure of which is hereby incorporated by reference in its entirety.

TECHNICAL FIELD

The present teachings relate to three dimensional (3D) printing and, more particularly, to the printing of a 3D structure, and the assembly of the 3D printed structure with other 3D printed structures or structures manufactured using other techniques.

BACKGROUND

The use of traditional manufacturing techniques is rapidly moving toward digital manufacturing. Additive or subtractive manufacturing (herein collectively, 3D printing) provides many advantages over traditional manufacturing techniques. For example, intricate structural designs that could not be formed previously using conventional techniques may be formed using 3D printing. Further, 3D printing provides a cost-effective method for manufacturing batch sizes as small as a single unit. Designs may be created using computer-aided design (CAD) software by an end user, or a user may download web-based software instructions to create a needed repair part or desired decorative structure at home or small business. Different print heads can add a plurality of different materials to the object being created (e.g. rubber, plastics, paper, polyurethane-like materials, metals, etc.).

Some 3D printed substructures may require assembly with other substructures after printing. For example, a 3D printed substructure may be attached to one or more other 3D printed substructures, to one or more conventionally manufactured substructure, or to both, using an adhesive. For assembly, two or more 3D printed structures may be transported after printing to an assembly station where an adhesive is manually applied to one or both substructures. The structures are then assembled using the adhesive to secure the two or more structures together.

A 3D printed structure and method that allows more rapid or convenient assembly of parts would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An embodiment of the present teachings may include a system for forming a structure, the system including a three dimensional (3D) printer. The 3D printer may include a first reservoir comprising a polymer, a second reservoir comprising an adhesive, a nozzle configured to dispense the polymer onto a platform to form a 3D substructure, and a nozzle configured to dispense the adhesive onto the 3D substructure.

In another embodiment, a method for forming a structure may include providing a three dimensional (3D) printer, wherein the printer includes a first reservoir comprising a polymer and a second reservoir comprising an adhesive. The method may further include dispensing the polymer from the first reservoir through a nozzle to print a 3D substructure using the 3D printer, and dispensing the adhesive from the second reservoir through a nozzle onto the 3D substructure using the 3D printer.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

Attaching a 3D printed substructure to other 3D printed substructures, to one or more conventionally manufactured substructure, or to both, using an adhesive requires the manual application of adhesive to the printed substructure. Manual application of adhesive may suffer from lack of precision, high cost, and potential for error.

In an embodiment of the present teachings, one or more adhesives may be applied by a 3D printer itself during formation of the 3D printed substructure, for example using one of the embodiments described below. Application of an adhesive by a 3D printer may improve adhesive placement precision and reduce cost and the potential for error. For purposes of this application, a "substructure" or "subassembly" is a structure that will be attached to another substructure to form a completed assembly (i.e., superstructure).

Figure 1:
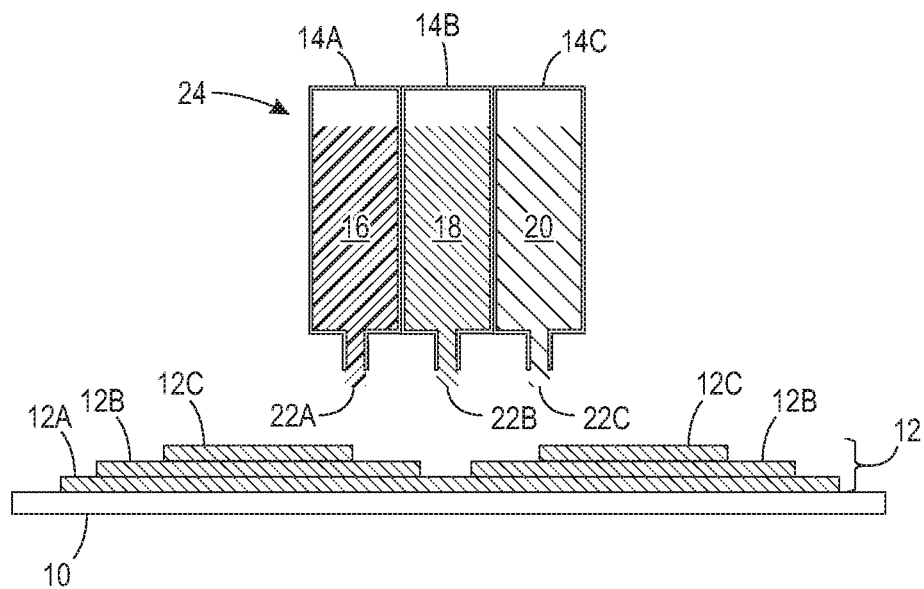
FIGS. 1-5 are schematic cross sections depicting various in-process structures in accordance with embodiments of the present teachings.

Printing of a 3D substructure and an adhesive, and assembly of two 3D printed substructures to form a completed assembly in accordance with an embodiment of the present teachings, is depicted in the cross sections of FIGS. 1-5. FIG. 1 depicts a 3D printer including a platform 10 and a plurality of material supplies 14, for example a plurality of reservoirs, that supply various liquid (viscous) materials 16-20 to be printed. The reservoirs may be supplied by different printheads or by different reservoirs in the same printhead, although other configurations are contemplated. In an embodiment, a material 18 such as a polymer is dispensed (e.g., ejected) by the printer from reservoir 14B through a nozzle 22B onto the platform 10. The nozzles 22 and reservoirs 14 may be part of a printhead 24. During printing, the printhead 24 moves in X-, Y-, and Z-directions to dispense a plurality of layers 12A-12C onto platform 10 to form a 3D substructure 12. Layers 12 may be about 100 µm or less in thickness. 3D printing of structures and substructures is well known in the art.

Figure 2:
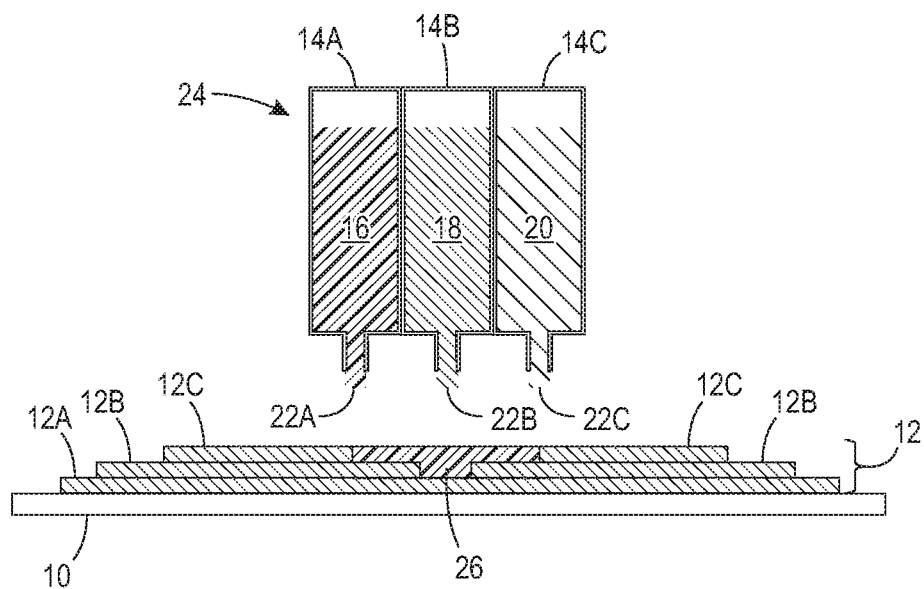

Subsequently, an adhesive 16 is dispensed by the printer through nozzle 22A onto the substructure 12 to provide a dispensed adhesive 26 as depicted in FIG. 2. The dispensed adhesive 26 may be an air-curable adhesive, an epoxy (for example, polyurethane, acrylic, cyanoacrylate, etc.), a thermoplastic, a thermoset, etc. The adhesive 16 may be dispensed into a recess in the 3D substructure 12 as depicted in FIG. 2, or over a flat surface or other structural topography. Because the adhesive 16 is dispensed using the 3D printer, the location and volume of adhesive 16 may be precisely controlled. It will be appreciated that, in another embodiment, the adhesive 16 may be dispensed prior to completing substructure 12, for example after depositing one or more of layers 12A and 12B, but before depositing layer 12C.

Figure 3:
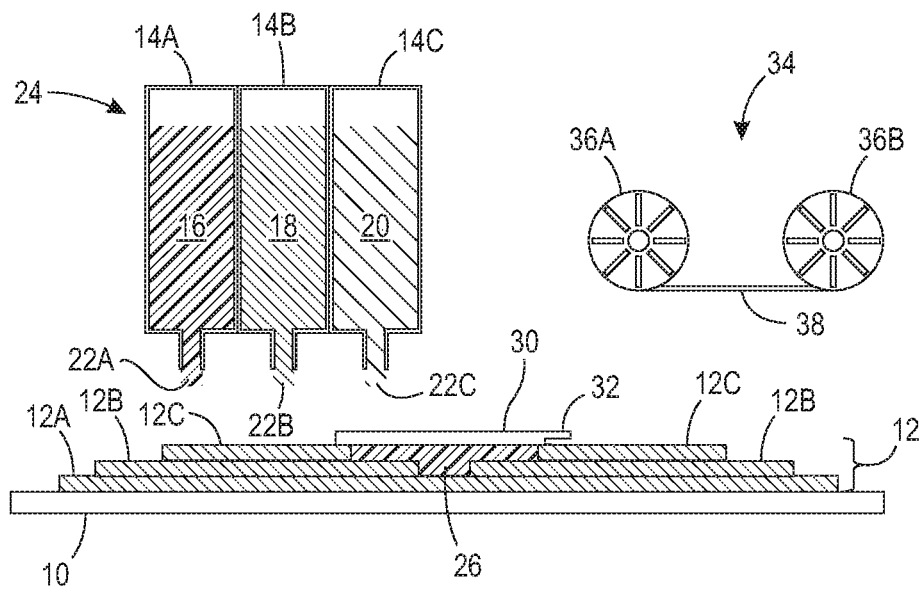

In an embodiment, the adhesive 26 may be an air-curable adhesive. A particular type of air-curable adhesive may have various desirable qualities for a particular application, but an unacceptably short working time. In an embodiment, an optional sealer 20 may be dispensed from reservoir 14C through nozzle 22C onto the top layer 12C to form a film covering 30 that covers dispensed adhesive 26 as depicted in FIG. 3. The film covering 30 reduces exposure of the adhesive 26 to air, thus slowing a cure rate of the adhesive 26. The film covering 30 may be formed to include a tab portion 32 for easy removal of the film covering 30. The formation of material overhangs, such as that required to print tab 32 of film covering 30 using the 3D printer, may be performed by an artisan skilled in the art of 3D printing.

In an alternate embodiment, instead of printing the film covering 30 using a liquid viscous material, the printer may include a tape and reel assembly 34 including a supply reel 36A and a take-up reel 36B. A tape assembly 38 includes a plurality of preformed solid film coverings 30. In this embodiment, the printer is configured to dispense a solid film covering 30 onto the top layer 12C and to cover dispensed adhesive 26 as depicted in FIG. 3. In either case, where the film covering is printed with a viscous material and cured, or dispensed as a solid preformed section 30, the film covering 30 is removed to expose the adhesive 26 prior to connecting the substructures 12, 40, described below.

In another embodiment, the dispensed adhesive 16 may be, for example, an adhesive that is curable using heat or ultraviolet (UV) light, such that the dispensed adhesive 26 has a sufficient working time without use or protection of a film covering 30. Further, adhesive 16 may be a B-staged adhesive wherein, after depositing, the adhesive 26 is partially cured prior to assembly. Subsequently, the substructures may be assembled hours or days later, at which time the B-staged adhesive is fully cured, for example heat cured, after assembly of the substructures.

Figure 4:
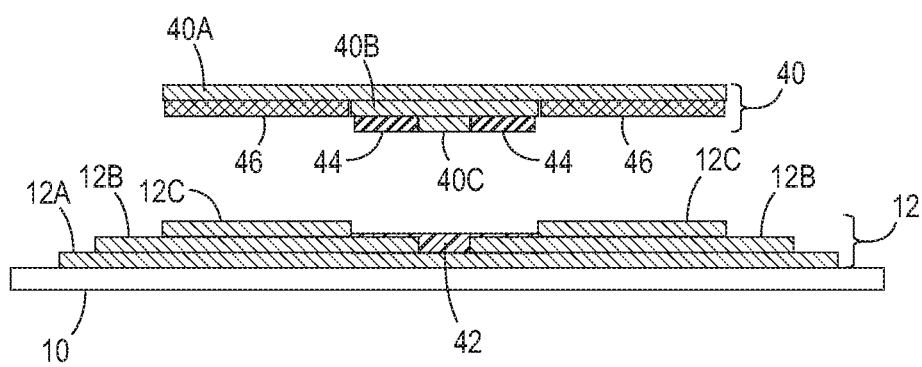
Figure 5:
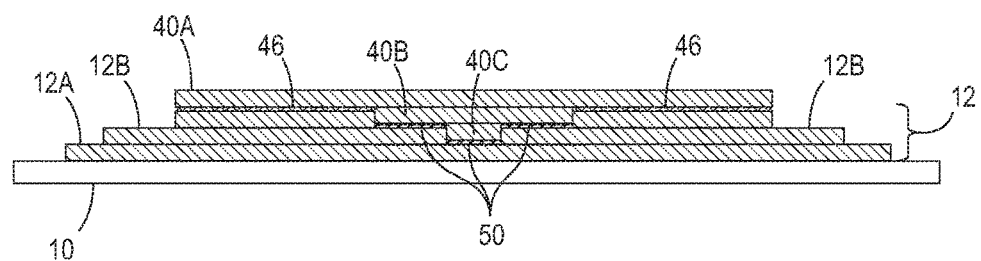

FIGS. 4 and 5 depict attachment of the first substructure 12 with a second substructure 40. The second substructure 40 may be another 3D printed substructure including a plurality of layers 40A-40C, or a part manufactured using conventional techniques (extrusion, injection molding, etc.). In this embodiment, a first adhesive 42 is dispensed using the 3D printer, and only partially fills the recess in substructure 12 as depicted. A second adhesive 44, which may be dispensed onto the second substructure 40 using a 3D printer, may be the same as, or different than, first adhesive 42. The FIG. 4 assembly may further include other adhesive layers 46, which may be the same or different than adhesives 42, 44. In an embodiment, the first adhesive 42 may be one of a resin component or a hardener component (i.e., curative agent) of a two-part epoxy, and the second adhesive 44 may be the other of a resin component or a hardener component of the two-part epoxy.

Next, the first substructure 12 and the second substructure 40 are connected together using the one or more adhesives 42-46 to form a completed structure or assembly similar to that depicted in FIG. 5. In an embodiment where adhesives 42 and 44 are two different components of a two-part epoxy adhesive, the components may combine to form an epoxy 50 as depicted in FIG. 5. Mixing of the epoxy components 42, 44 may be enhanced and improved using an X-Y scrub of the two substructures 12, 40, if the design and tolerances of substructures 12, 40 allow an X-Y scrub. For purposes of the present teachings, an X-Y scrub includes the use of relative planar movement between two substructures 12, 40 in the X- and Y-directions to enhance mixing of the two-part epoxy components 42, 44 interposed therebetween. Connection of the two substructures 12, 40 may include a curing process, such as a heat cure or a UV light cure, to set one or more of the adhesives 42-46.

In an embodiment, the 3D printed substructure may be printed to have a rough surface texture to increase surface area at the adhesive location. This prevents the need for a final assembler (person or machine) to roughen the surface, for example by manually sanding, prior to assembly.

In another embodiment, substructures similar to substructures 12, 40 may be formed using a 3D printing process that includes the use of laser heating of a powdered solid, or a subtractive process in which a volume of raw material is cut to remove excess material. The viscous adhesive layers 26, 42-46 and film covering 30 may be then be applied to the substructures 12, 42 using the 3D printer as described above.

Thus embodiments of the present teachings may include the use of 3D printing technology in a single step manufacturing operation to create a set of parts for assembly. An embodiment may include printing one or more 3D printed substructures using a 3D printer, then printing an adhesive directly onto the 3D printed part using the 3D printer that also prints the 3D printed part. Direct application of the assembly adhesive as part of the printing operation may enable increased assembly automation, reduce assembly variability, and may result in reduced cycle times, overhead costs, energy input, and part fall-out rate. Substructures may then be conveniently assembled and secured together without requiring the final assembler (person or machine) to select and apply the adhesive. Printed parts, including one or more 3D printed adhesives, may be shipped by a manufacturer to a user at a different location, for example a subcontractor manufacturing site, a construction site, or another location for later assembly. In this embodiment, the original manufacturer specifies the location of the adhesive and also prints correct quantity of adhesive, thus reducing the potential for error in adhesive placement, adhesive composition, and/or adhesive quantity by the final assembler.

Due to the curing rate of some adhesives, the printed adhesive may have an expiration date based on the cure rate of the adhesive. A printing date of the 3D substructure may be based on the expiration date of the printed adhesive, such that the substructure may be printed and shipped by the manufacturer, then assembled later by the user, prior to expiration of the adhesive.

In an embodiment, during design, two or more substructures, one or more adhesives (e.g., one or more epoxies, including one or more resins and hardeners), and any desired film coverings, are specified, for example as CAD data, and sent to a 3D printer that is capable of manufacturing the various elements. In an embodiment, the CAD software may specify a particular adhesive based on the type of material from which the part will be formed, for example through a main software program, through a plug-in, or an application programming interface (API). Submission of the CAD data and production specification may be done by direct connection, network, or wirelessly (e.g. from a mobile device). The 3D printer creates the parts and the appropriately-located epoxies, hardeners, and coverings using 3D printing methods. The 3D printer may include separate heads for each material, or one head including a plurality of materials. Each different material may be printed through a separate nozzle, although it is contemplated that each material from a separate material reservoir may be printed through a single nozzle. A plurality of layers, where each layer is less than one micron thick, are serially applied by the printer, building up the substructures and dispensing the one or more epoxies, hardeners, and coverings. Depending on the specification and the capabilities of the 3D printer, an individual part, including its associated epoxies, hardeners, and coverings, may be produced in a single manufacturing operation. Each part (i.e., substructure) may be printed separately, or some or all parts (and their associated epoxies, hardeners, and coverings) may be produced in a single manufacturing operation. In some embodiments, the materials for the substructures, epoxies, hardeners, and/or coverings may be included in the same layer or layers, for example when two or more of these materials are on the same physical plane in 3D space.

In an embodiment, an epoxy resin and hardener may be formulated to cure relatively quickly when they come into contact with each other. In another embodiment, the adhesive may cure upon application of a catalyst, for example heat, UV light, a chemical catalyst, etc. In an embodiment, two subassemblies are physically attached together solely using the 3D printed adhesive and no other material. In other embodiments, a screen printed adhesive, sprayed adhesive, etc., and/or clamps or latches may be used in conjunction with the 3D printed adhesive to hold the subassemblies together.

Figure 6:
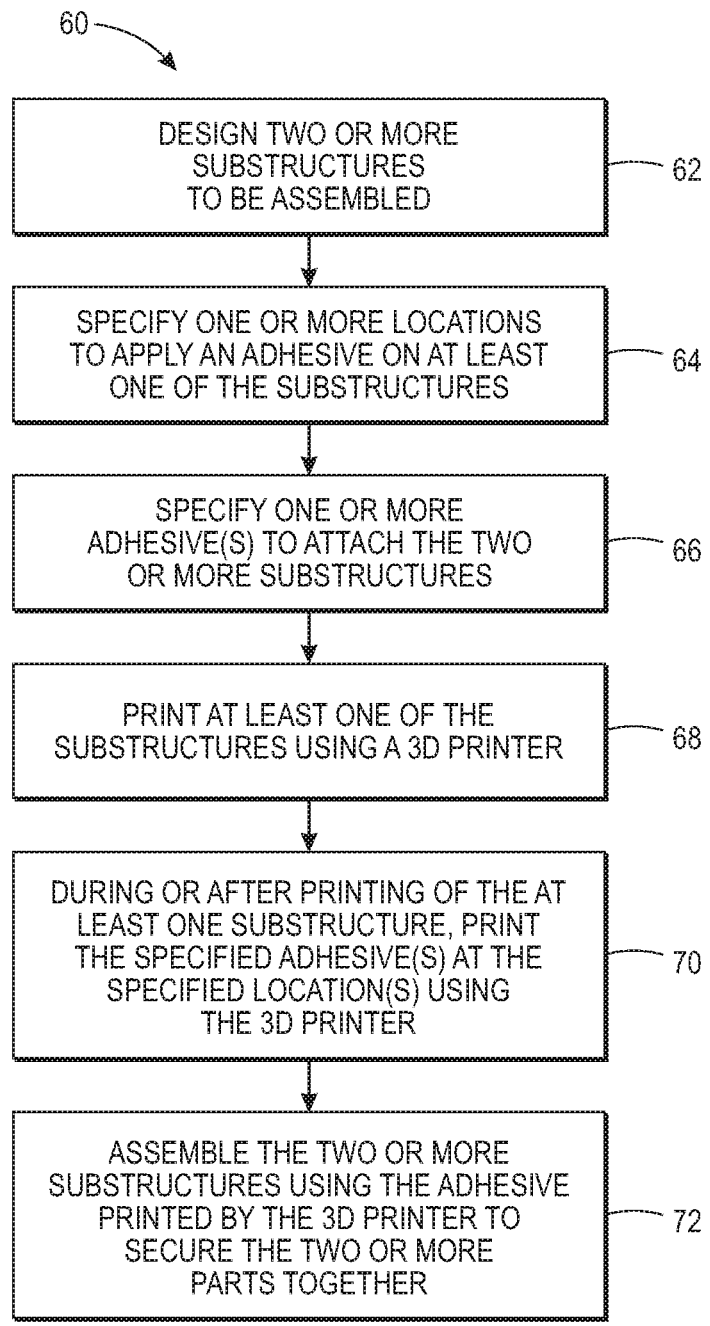
FIG. 6 is a flow chart of a method in accordance with an embodiment of the present teachings.

FIG. 6 is a flow chart of a method 60 for forming a completed structure in accordance with an embodiment of the present teachings. At 62, two or more substructures to be assembled are designed and may be implemented in software. At least one of the substructures will be a part printed using a 3D printer. At 64, a location at which to apply an adhesive on the 3D printed substructure is specified and, at 66, the specific adhesive(s) is (are) specified. The adhesive may be selected based on the materials to be joined and/or a curing time or a curing technique (air-cure, UV cure, temperature cure) of the adhesive. The design and adhesive instructions are sent to a 3D printer and, at 68, at least one of the substructures designed at 62 is printed using the 3D printer. At 70, either during or after printing of the part(s) at 68, the one or more adhesives specified at 66 are printed at the location specified at 64 using the 3D printer. Next, the two or more substructures designed at 62 are assembled 72 using the adhesive printed at 70.

Figure 7:
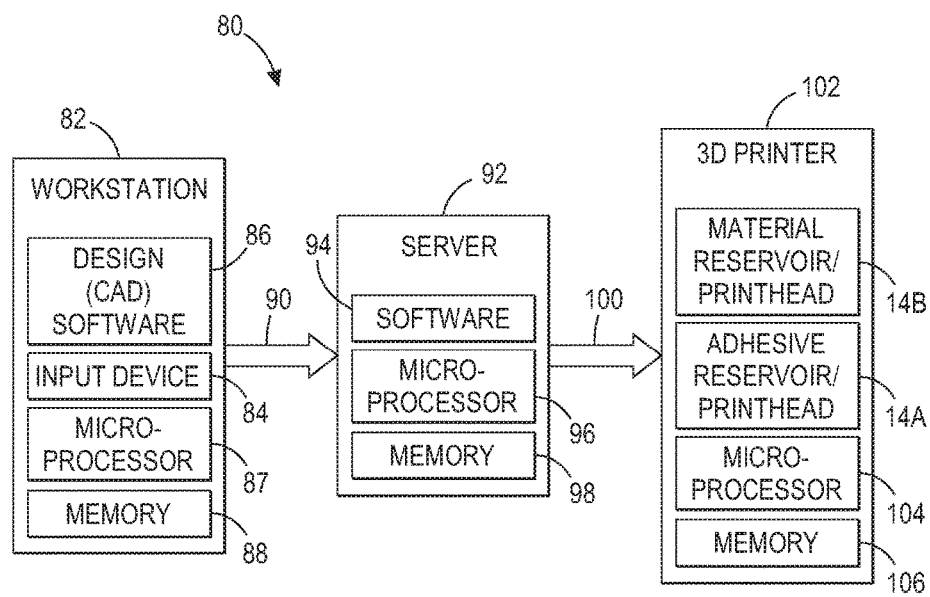
FIG. 7 is a schematic depiction of a system in accordance with an embodiment of the present teachings.

FIG. 7 is a block diagram depicting a system 80 in accordance with the present teachings which can be used to implement the embodiments described above. The system 80 can be an electronic system, for example a computer system, which implements a method to form a 3D printed substructure (such as 12 or 40, FIG. 4) and an adhesive (such as 42, 44, and/or 46, FIG. 4). The system 80 of FIG. 7 may include one or more workstations 82, such as individual computers, networked computers, etc., which receive human input, for example through an input device 84 such as a keyboard, mouse, etc., from an engineer, technician, or CAD layout designer, to create a design using software 86. The workstation 82 may include electronics such as one (or more) microprocessors 87, memory 88, etc. Each workstation 82 may communicate wirelessly, via a cable, etc. 90 with a server 92, such as one or more computers, minicomputers, mainframes, etc. The server 92 can include software 94 to perform a set of instructions, one or more microprocessors 96, memory 98, etc. The software 94 can include design (layout) software that performs a pattern generation to translate the design created using the design (CAD) software 86 into coordinate data and instructions to be transferred wirelessly, via a cable, etc. 100, to a 3D printer 102, which executes the instructions. As described above, the 3D printer 102 may include one or more material reservoirs or printheads 14B that includes material 18 used to print a body 12, 40 of the substructure, and one or more adhesive reservoirs 14A that includes an adhesive 26, 42-46. The 3D printer 102 may also include electronics such as one or more microprocessors 104, memory 106, etc. The system 80 may thus include a non-transitory computer readable storage medium having a program stored thereon that directs the 3D printer to perform 3D printing of the one or more substructures 12, 40 and adhesives 26, 42-46 as described above.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for forming a structure, comprising:
   providing a three dimensional (3D) printer, wherein the printer comprises:
      a first reservoir comprising a polymer; and
      a second reservoir comprising an adhesive;
   dispensing the polymer from the first reservoir through a nozzle to print a 3D substructure using the 3D printer;
   dispensing the adhesive from the second reservoir through a nozzle onto the 3D substructure using the 3D printer; and
   covering the adhesive with a film covering to slow a cure rate of the adhesive.

2. The method of claim 1, wherein the 3D substructure is a first substructure, and the method further comprises attaching a second substructure to the first substructure using the adhesive printed using the 3D printer.

3. The method of claim 2, further comprising printing the second substructure using the 3D printer to form a second 3D substructure.

4. The method of claim 3, further comprising:
   printing an epoxy hardener component onto the first 3D substructure using the 3D printer during the printing of the adhesive onto the first 3D substructure;
   printing an epoxy resin component onto the second 3D substructure using the 3D printer;
   contacting the epoxy hardener component and the epoxy resin component to form an epoxy adhesive; and
   curing the epoxy adhesive to attach the first 3D substructure to the second 3D substructure.

5. The method of claim 4, further comprising performing an X-Y scrub after contacting the epoxy hardener component and the epoxy resin component to enhance mixing of the epoxy hardener component and the epoxy resin component.

6. The method of claim 1, further comprising:
   printing the adhesive into a recess within the 3D substructure using the 3D printer; and
   printing the film covering over the adhesive to slow the cure rate of the adhesive.

7. The method of claim 6, further comprising printing a tab portion to assist in the removal of the film covering to expose the adhesive.

8. The method of claim 1, wherein the printing of the adhesive onto the 3D substructure using the 3D printer comprises printing at least one of a polyurethane, an acrylic, a cyanoacrylate, a thermoplastic, and a thermoset.

9. The method of claim 1, further comprising curing the adhesive using ultraviolet (UV) light.

10. The method of claim 1, wherein the printer further comprises a third reservoir comprising the film covering, wherein the film covering is a liquid viscous material, and wherein covering the adhesive with the film covering comprises dispensing the film covering through a nozzle onto the 3D substructure using the 3D printer.

11. The method of claim 1, wherein the film covering is a plurality of preformed solid film coverings.

* * * * *